United States Patent [19]
Day

[11] Patent Number: 5,860,329
[45] Date of Patent: Jan. 19, 1999

[54] PEDALING MECHANISM FOR BICYCLES AND THE LIKE

[76] Inventor: Franklin J. Day, 310 N. Civic Dr., #510, Walnut Creek, Calif. 94596

[21] Appl. No.: 819,165

[22] Filed: Mar. 17, 1997

[51] Int. Cl.⁶ .................................................. B62M 1/02
[52] U.S. Cl. ................................. 74/594.1; 74/143
[58] Field of Search .................. 74/594.1, 594.3, 74/143; 192/64, 48.92; 280/253

[56] References Cited

U.S. PATENT DOCUMENTS

| | | |
|---|---|---|
| 87,769 | 3/1869 | Gardner et al. . |
| 88,574 | 4/1869 | Lindon . |
| 241,395 | 5/1881 | McKenzie . |
| 302,090 | 7/1884 | Bernhard . |
| 328,353 | 10/1885 | Starr . |
| 433,720 | 8/1890 | Chace . |
| 483,495 | 9/1892 | Hunter . |
| 564,408 | 7/1896 | Condon . |
| 611,764 | 10/1898 | Arnold . |
| 1,058,123 | 4/1913 | Whitaker . |
| 3,820,820 | 6/1974 | Kutz ......................................... 280/252 |
| 3,877,724 | 4/1975 | Chase ....................................... 280/241 |
| 3,994,509 | 11/1976 | Schaeffer ................................. 280/242 |
| 4,379,566 | 4/1983 | Titcomb ................................... 280/251 |
| 4,453,729 | 6/1984 | Lucken ..................................... 280/242 |
| 4,538,826 | 9/1985 | Lemarie ................................... 280/242 |
| 4,639,007 | 1/1987 | Lawrence ................................. 280/234 |
| 4,762,332 | 8/1988 | Seol ......................................... 280/242 |
| 4,925,200 | 5/1990 | Jones ....................................... 280/233 |
| 5,088,340 | 2/1992 | Seol ......................................... 74/143 |
| 5,184,837 | 2/1993 | Alexander ............................. 280/250.1 |
| 5,228,709 | 7/1993 | Kao ..................................... 280/250.1 |
| 5,390,773 | 2/1995 | Proia ......................................... 192/45 |

OTHER PUBLICATIONS

Whitt & Wilson, *Bicycling Science*, 1995, pp. 63, 281.
Gross et al., The Aerodynamics of Human–powered Land Vehicles, *Scientific American*, Dec. 1993.

*Primary Examiner*—Charles A. Marmor
*Assistant Examiner*—Mary Ann Battista
*Attorney, Agent, or Firm*—Chernoff, Vilhauer, McClung & Stenzel, LLP

[57] ABSTRACT

A unidirectional power drive mechanism operated by a plurality of crank arms and associated one-way clutches connecting the crank arms independently to a crankshaft arranged to provide a unidirectional power output. The crank arms are able to rotate through full revolution to drive the crankshaft in a forward direction with either one of the crank arms separately applying torque to the crankshaft, or with both crank arms together applying torque in a forward direction, but each crank arm is free to rotate rearwardly with respect to the crankshaft. This arrangement of and inclusion of the various components substantially improves many aspects of energy throughput of human powered machines.

13 Claims, 5 Drawing Sheets

0　　　500 N
0　　　10 lbf 0　　　500 N
0　　　10 lbf

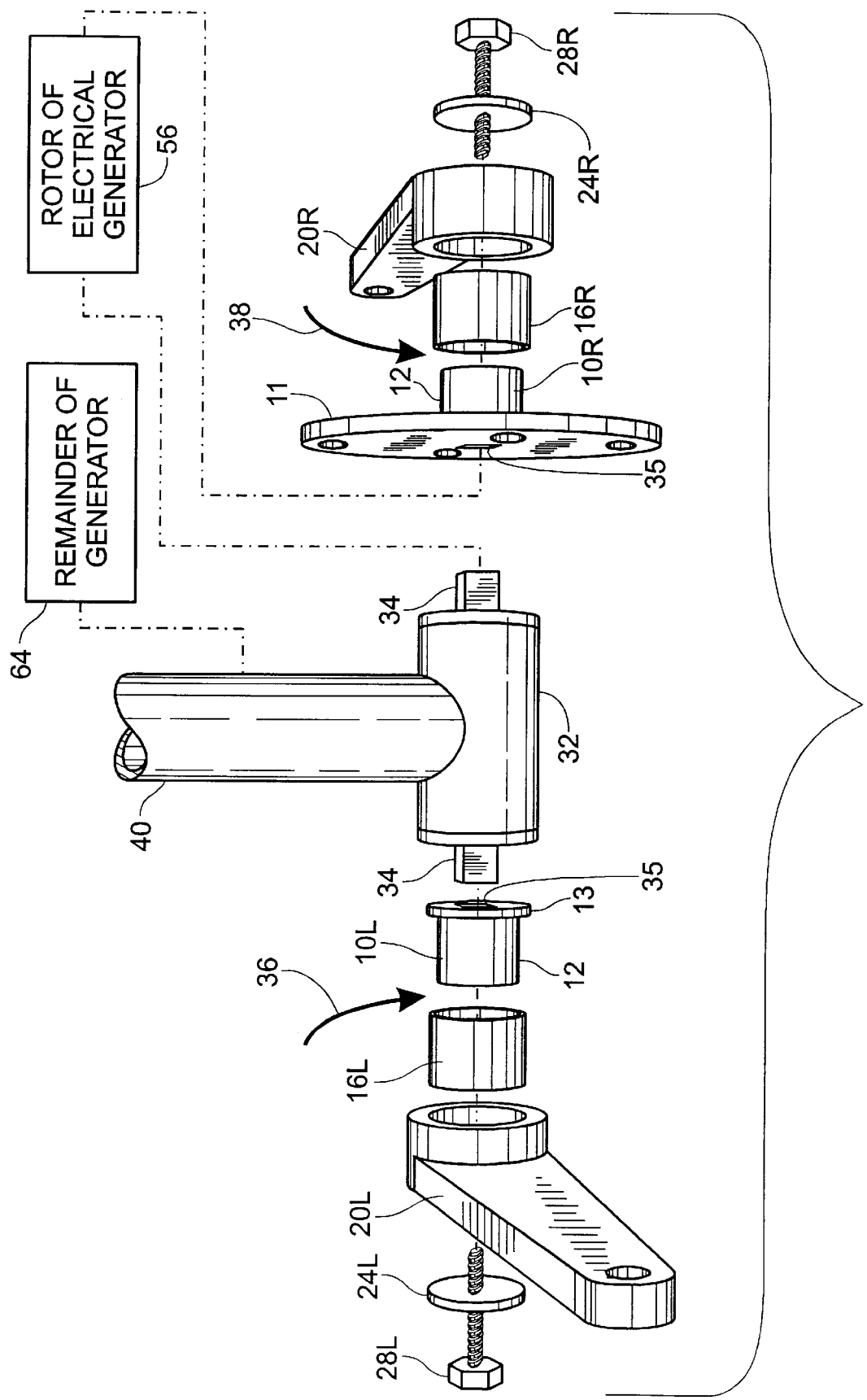

PEDALING MECHANISM FOR BICYCLES AND THE LIKE

BACKGROUND OF THE INVENTION

This invention relates to an improvement in power transfer apparatus for human powered machines.

DESCRIPTION OF PRIOR ART

Human powered machines require that energy generated by the human be transferred to the machine, typically as seen in a bicycle or the like. An internal loss is any loss of energy between the input and the useful work output of the machine. In any machine internal losses must be minimized in order to maximize the power available to do useful work.

Modern racing bicycles are thought to have very small internal losses, these being due mainly to bearing friction losses in the chain and wheel bearings. (See F. R. Whitt and D. G. Wilson, *Bicycling Science* (Cambridge: The MIT Press, 1995), p. 281). Therefore, it is generally thought that the two major impediments to increased speed for any individual bicyclist are aerodynamic drag and the limits on muscle strength and endurance. (See Gross, Kyle, and Malewicki, The Aerodynamics of Human-Powered Land Vehicles, Scientific American, December 1993.) However, simply pedaling in a circular motion using a traditional pedaling system involves large losses from the amount of energy generated by the rider to that delivered to the driven wheel, a form of internal loss, through the failure to completely unweight the pedal during the recovery phase of the stroke. These losses are not easily eliminated by conventional training methods since studies have shown that even professional cyclists do not unweight the pedals during the upstroke. (See F. R. Whitt and D. G. Wilson, *Bicycling Science* (Cambridge: The MIT Press, 1995), p. 63). Experiments measuring the amounts of these forces show them to be substantial. Using representative data (found in FIG. 1) the losses due to the failure to completely unweight the pedal on the recovery phase of the stroke can be calculated. Using this data, if one could simply eliminate these "negative" forces on the pedal during the upstroke (see FIG. 2) the power throughput to the wheel would be increased 50%. Therefore, while the traditional power transfer system is simple and, generally, considered to be reasonably efficient, substantial internal losses are present.

No prior art directly addresses a solution to this problem, although there are two prior devices that, at first glance, do seem to address this problem. The arrangement described in U.S. Pat. No. 5,088,340 to Seol does eliminate the problem of applied resistance on the upstroke in one of its three modes of operation, but the benefits of this mode are apparently unrecognized by Seol, since Seol never mentions this advantage. Further, if Seol had recognized the true advantage of this mode he would have eliminated his other modes and simplified his device. Instead, Seol has a complicated series of chainwheels and auxiliary brackets and shafts to allow transmission of power to the driven wheel in any of three different modes. Such a device is complicated, heavy, and cannot be attached to a conventional bicycle without substantial modification. Furthermore, Seol's mechanism requires three one-way clutches to be present (one at each end of the crankshaft plus the freewheel on the driven wheel).

U.S. Pat. No. 5,390,773 to Proia also shows two independent one way clutches on the crankshaft of a conventional bicycle in a manner that allows independent lever action. The device disclosed does allow the removal of the one-way clutch from the chain-driven wheel, but Proia deliberately prevents his device from being pedaled in a conventional circular fashion by the attachment of a spring between the frame and each lever arm. This spring also adds to the internal losses of his device since the rider must overcome the force of the spring on each pedal stroke before any useful work can be performed.

SUMMARY OF THE INVENTION

The present invention provides a power transfer mechanism for use on human-powered machines which overcomes the aforementioned shortcomings found in previously available power transfer mechanisms and also provides additional improvements in flexibility of operation. The present invention provides a power transfer mechanism including a single crankshaft mounted for rotation about a transverse axis defined by a crankshaft housing, at least one rotary drive element fixed to the crankshaft and provided with a flexible drive member engaged therewith for transfer of power from the crankshaft to a power output device; a pair of crank arms, each independently rotatable about the crankshaft axis through an unlimited angle of rotation; and a pair of one-way clutches, each drivingly interconnecting one of the crank arms with the crankshaft, which limit rotation of either crank arm with respect to the crankshaft in one direction.

In one embodiment of the invention the rotary drive element fixed to the crankshaft is a chainring and has an endless loop chain engaged therewith to transfer power from the crankshaft to an output device such as the rear wheel of a bicycle.

In another embodiment of the invention, the rotary drive element fixed to the crankshaft may be a belt drive pulley and the flexible drive member may be an endless belt engaged therewith.

In another embodiment of the invention, the rotary element fixed to the crankshaft may be the rotor element of an electrical generator, the rest of the generator being attached to or incorporated into the frame of the machine.

Further objects, advantages, and features of my invention will become apparent from consideration of the drawings and ensuing description.

BRIEF DESCRIPTION OF THE DRAWINGS

FIG. 9 is a schematic exploded view of a machine incorporating an electrical generator driven by a mechanism incorporating the present invention.

DETAILED DESCRIPTION OF THE PREFERRED EMBODIMENT

Figure 3:
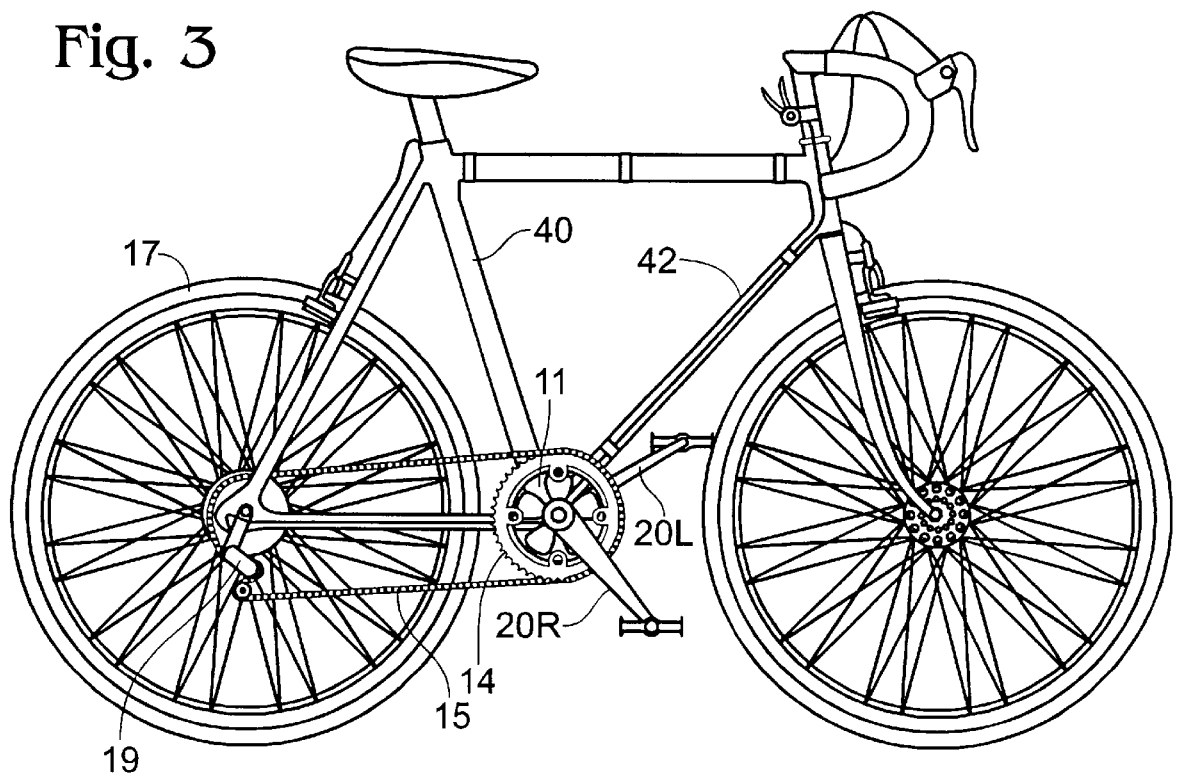
FIG. 3 is a simplified view of a bicycle including a mechanical drive incorporating my invention.
Figure 4:
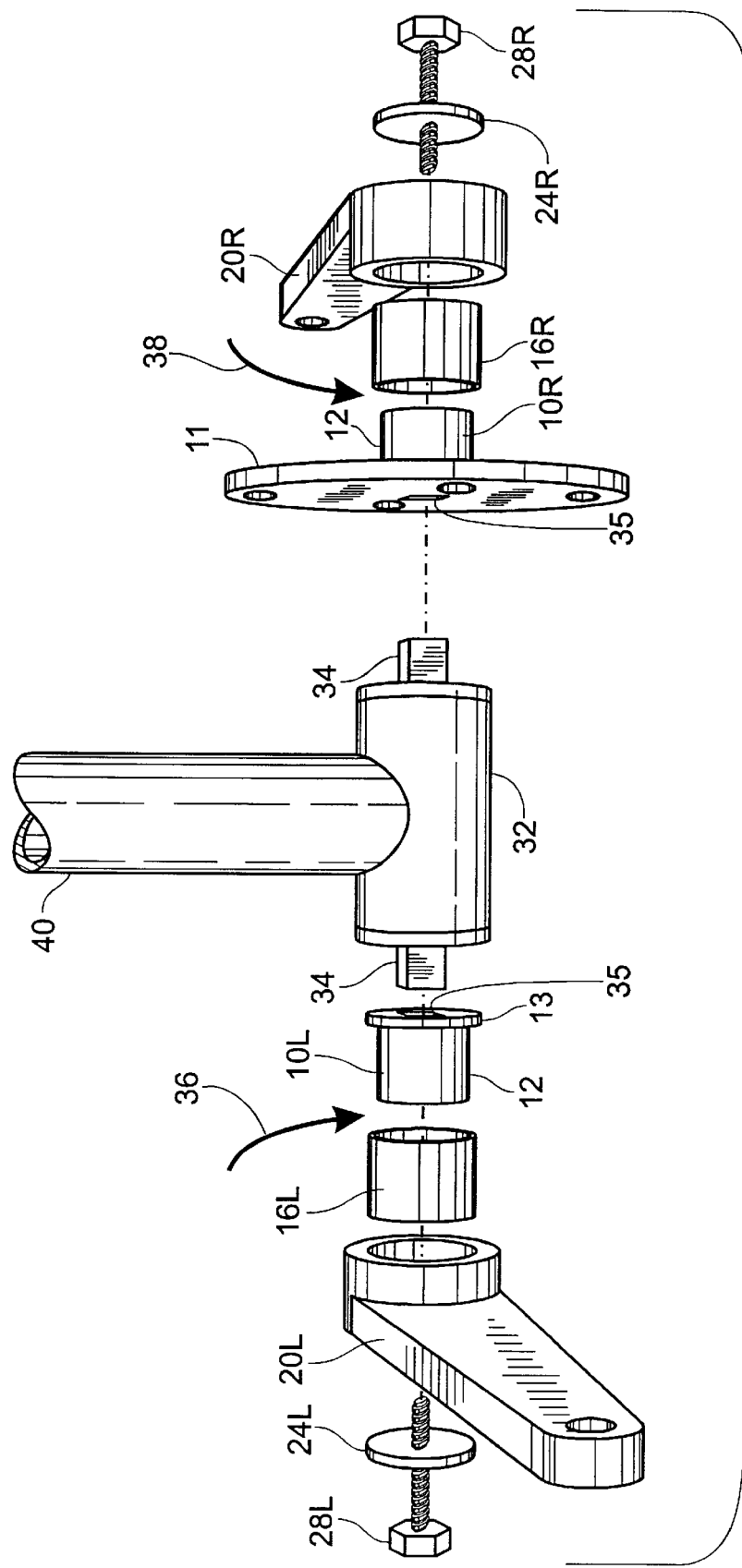
FIG. 4 shows an exploded rear view of the right and left sides of a mechanical drive system incorporating my invention in relation to the bottom bracket of a bicycle frame.
Figure 5:
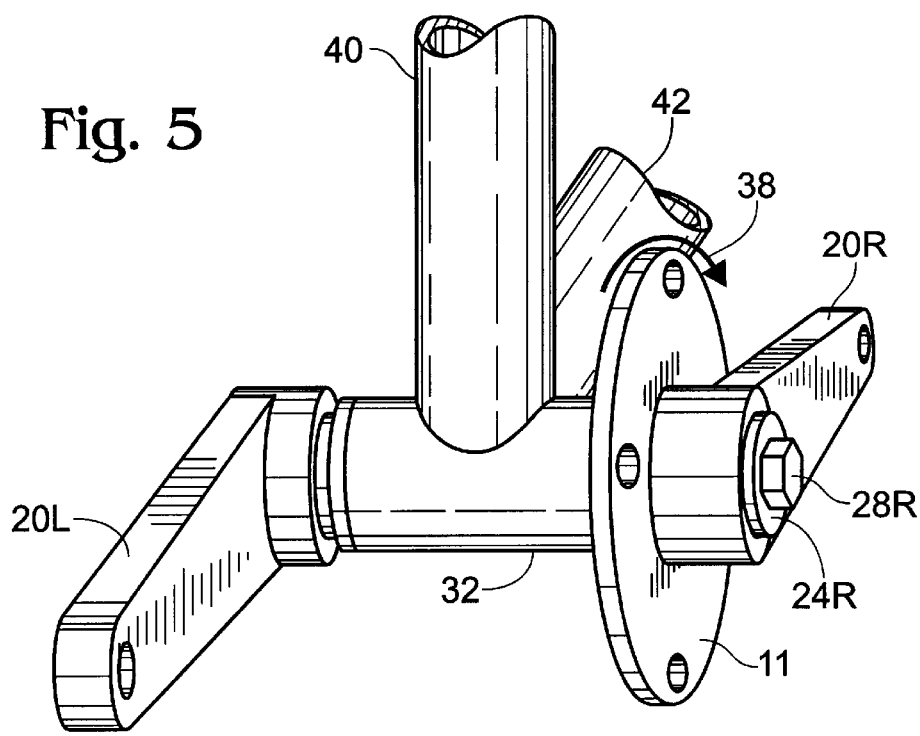
FIG. 5 is a rear view of the drive system shown in FIG. 4, assembled with the bottom bracket of a bicycle frame.

A preferred embodiment of the present invention, as shown in FIGS. 3, 4, and 5 consists of a replacement chainring-driving mechanism for installation in a conventional bicycle 9 using an existing conventional crankshaft 34 mounted in a conventional crankshaft bearing housing or bottom bracket 32 (also shown for orientation purposes are a seat tube 40 and a down tube 42 that are part of a frame of the bicycle 9). A conventional chainring 14 drives an endless chain 15 to drive the rear wheel 17 in a conventional manner, such as through a set of cogs mounted on the rear wheel 17 and of which one may be selected by the use of a derailleur 19. In a traditional pedaling system, the squared end of the crankshaft 34 fits snugly into a mating female receptacle at the axis of rotation of a pedal lever, or crank arm. In the embodiment of the present invention shown in FIGS. 4, 5, 6, and 7, a right sided crankshaft adapter 10R and a left sided crankshaft adapter 10L each are fitted over the respective squared male end of the crankshaft 34 via a mating square female receptacle 35 in each adapter 10R or 10L. This allows each said crankshaft adapter 10R or 10L to be fixed tightly to the crankshaft 34 in the same way as a conventional pedal crank arm, to prevent any relative motion of the crankshaft adapter 10R or 10L in rotation, translation or angulation. Each crankshaft adapter 10R or 10L also incorporates a cylindrical bearing surface 12, and a respective radially extending inner flange 11 or 13. The left inner flange 13 only need extend beyond the bearing surface 12 far enough to act as a barrier to prevent inward migration of a clutch bearing 16L, that rides on the bearing surface, during use. The inner flange 11 of the right side crankshaft adapter 10R is substantially larger in diameter to function also as a chainwheel support bracket to which is attached one or more conventional chainrings 14 using conventional chainring attachment devices (not shown). Each said bearing surface 12 is appropriately sized, shaped and hardened to accept either a right sided one-way clutch 16R or left sided one-way clutch 16L (Torrington drawn cup roller clutch, RCB 30, for example, available from The Torrington Company, Torrington, Conn.). Each said right sided one-way clutch or left sided one-way clutch is affixed (for example, by a pressed fit) to the fulcrum or inner end of a right sided crank arm 20R or left sided crank arm 20L, securely enough to transmit the torque generated in the crank arm to the clutch. At the other end of each said crank arm is a means for accepting any conventional pedal (not shown) that incorporates a means of attaching the pedal to the rider's foot.

Each said combination of crank arm and clutch is then slipped onto the bearing surface found on either said right or left crankshaft adapter (10R, 10L) in such a manner as to cause each of said pedal levers to drive the crankshaft 34 when rotated clockwise (forward) when viewed from the right, as indicated by the arrows 36 and 38, and to rotate freely with respect to the crankshaft 34 when rotated in the opposite direction. A right endcap 24R and left endcap 24L are each designed to securely hold each respective crankshaft adapter 10R and 10L onto the crankshaft 34 and each said crank arm and one-way clutch assembly to each said crankshaft adapter when a right threaded bolt 28R or left threaded bolt 28L is passed through a hole in the center of each endcap 24R, 24L and screwed tightly into the threaded hole present in the respective end of the crankshaft 34. Therefore, a drive mechanism incorporating the present invention can be attached to a conventional bicycle in exactly the same way as a conventional pedal system, is simple, and weighs barely more than a conventional pedal system.

Figure 8:
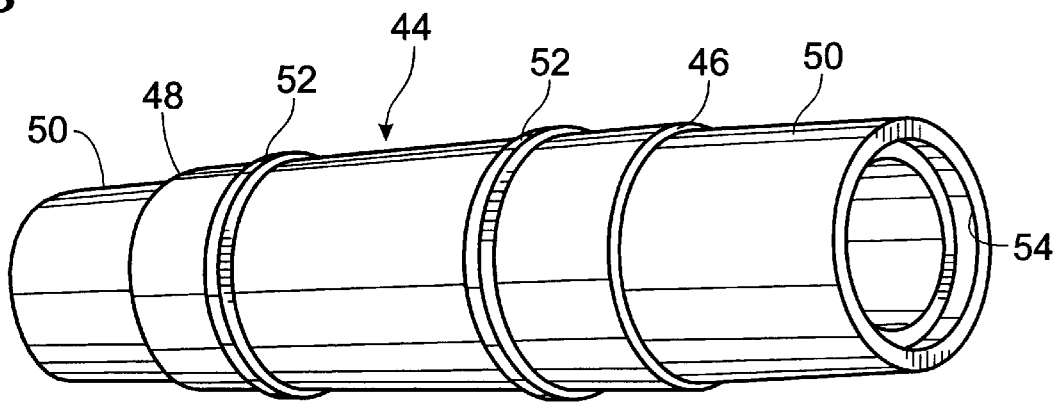
FIG. 8 shows a crankshaft for an alternative embodiment of the invention, in which the crankshaft incorporates the clutch bearing surfaces into a single piece.

An alternative embodiment of the invention, shown in FIG. 8, includes a crankshaft 44. In the crankshaft 44 counterparts of the radially-extending inner flanges 11 and 13 incorporated in adapters 10L and 10R of the previously described embodiment of the invention are incorporated in the crankshaft 44, as indicated at 46 and 48. The cylindrical bearing surfaces required by the one-way clutches 16R and 16L are incorporated in the crankshaft 44, at 50, and the bottom bracket bearing surfaces are shown at 52. In this embodiment an alternative method of attaching the endcaps would be required, such as screwing directly into the end of the crankshaft at 54. Also, an alternative method of attaching a chainring support bracket to the crankshaft would be required, such as using a collar with set screw (not shown).

OPERATION

Figure 1:
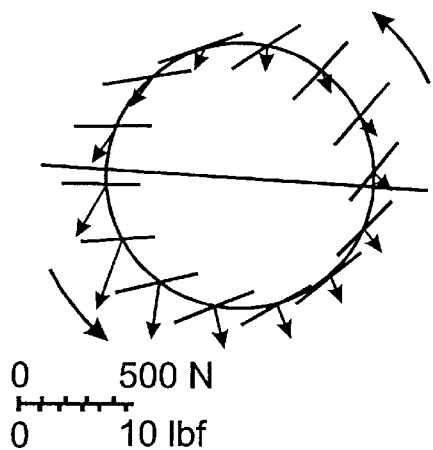
FIG. 1 is a force diagram showing the application of forces on the pedals of a conventional bicycle at various stages of the pedal stroke which is a reproduction of FIG. 2.22 from F. R. Whitt and D. G. Wilson, *Bicycling Science* (Cambridge: The MIT Press, 1995) at p. 63.
Figure 2:
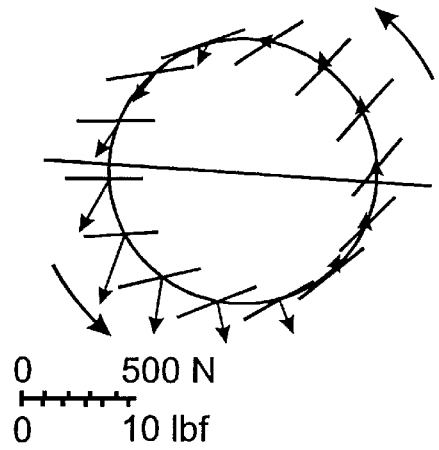
FIG. 2 is a force diagram showing the anticipated application of forces on the pedals of a mechanical drive assembly including my invention at various stages of the pedal stroke.

The power transfer mechanism of the present invention can be used in a manner identical to conventional pedaling systems as long as enough "forward" force is maintained on each pedal during the recovery phase to maintain the circular pedaling motion. This requires that the pedal must be attached to the rider's foot in some fashion to transmit these forces. If enough force is not applied to lift the pedal at the same rate as the rate of rotation of the other pedal, the pedals will instantaneously become "out of synch," making further pedaling difficult until corrected. This feature will, with continued use, cause the rider to develop strength and endurance in the muscles required to maintain positive pressure on the pedal during the entire 360° arc of the pedals for long periods of time. This absolutely eliminates and prevents any losses due to weighting of the pedal on the upstroke, improving power output substantially. With time, the muscles and coordination can be further developed to provide substantial positive pressure on the pedal during the upstroke thus supplying torque through each of the crank arms 20L and 20R, the respective one-way clutches 16L and 16R, and the adapters 10L and 10R to rotate the crankshaft 34, and the increase in power output will be even more dramatic, as shown by comparison between FIGS. 1 and 2.

Another advantage of this invention is that it allows the elimination of the one-way clutch (freewheel) on the driven wheel 17. As opposed to Seol's invention, which will not operate properly without a freewheel on the driven wheel, a mechanism incorporating this invention will operate well with or without a freewheel on the driven wheel. Elimination of the freewheel on the driven wheel would allow for reduced overall weight of the bicycle and, at the same time, allow for shifting a derailleur shifting mechanism 19 while coasting, as long as the bicycle is moving forward, since the chain would rotate continuously, even while coasting.

Figure 6:
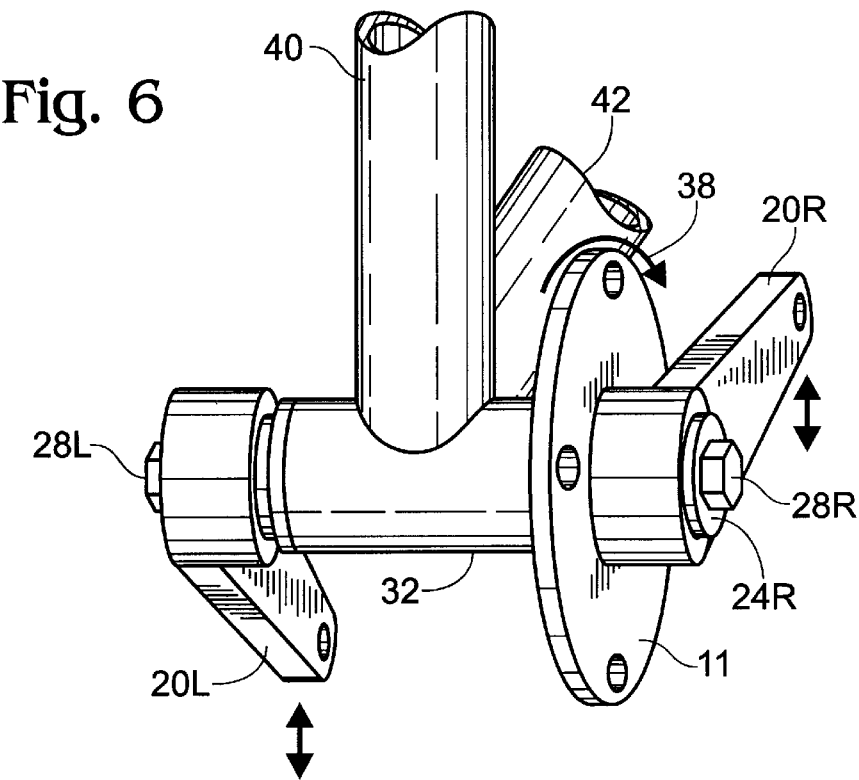
FIG. 6 is a rear view showing the anticipated usual limits of motion of the drive system shown in FIG. 4 on a bicycle, with the rider using a reciprocating, up and down pedaling motion.

Additionally, with this power transfer mechanism, the rider may also use a reciprocating up and down motion as shown in FIG. 6, rather than the traditional circular pedaling motion. It is anticipated that most riders will not use this motion except, perhaps, under very unusual circumstances, such as climbing very steep hills. When pedaling in a reciprocating fashion the pedals will be depressed in an alternating fashion through a vertical height of about 6–8 inches, comprising an arc of about 45–60 degrees. While one pedal is being depressed the other will be returned to the proper position for the next application of power. The movement of the feet would be in an alternating fashion similar to climbing stairs, while movement of the pedals will be in the sector of the circle of pedal rotation where gravity best assists the rider in applying force.

Figure 7:
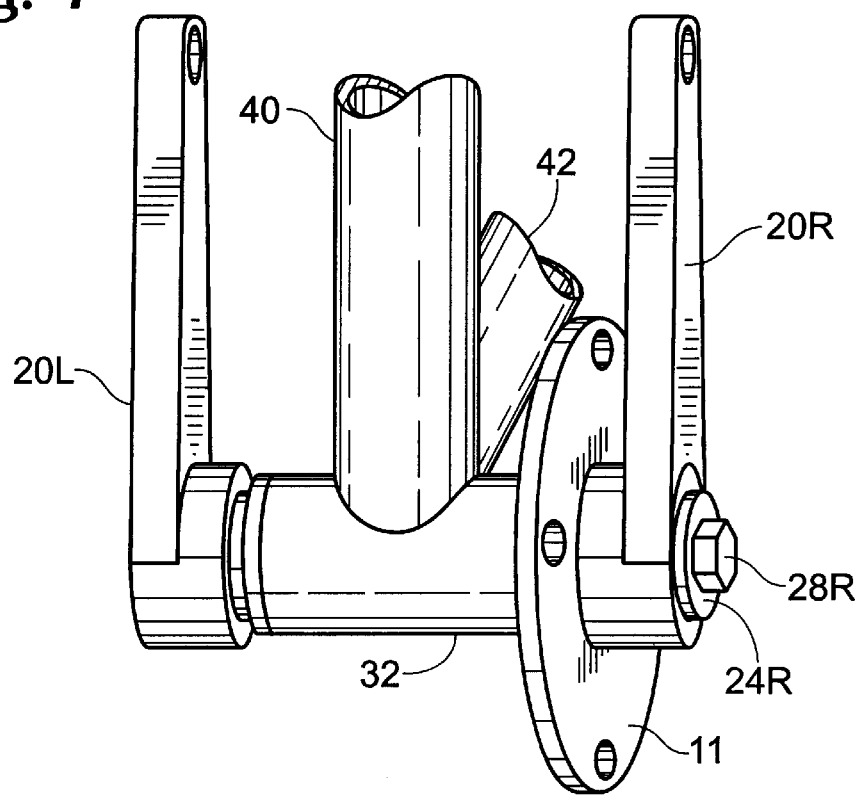
FIG. 7 is a rear view showing the configuration of the drive system shown in FIG. 4 on a bicycle when both pedals are in the top dead center position to minimize frontal area and thus minimize aerodynamic drag.

Another advantage of the device is that it allows the rider to raise both feet at the same time when coasting down hills in order to reduce frontal area, improving aerodynamic efficiency as illustrated in FIG. 7.

Although the description above contains many specifics, these should not be construed as limiting the scope of the invention, but as merely providing illustrations of some of the presently preferred embodiments of this invention. For example, crankshaft 34 and crankshaft adapters 10L and 10R can be connected together in another fashion or manufactured as a single entity as illustrated in FIG. 8. A different sized bottom bracket bearing housing 32 could be used on new design bicycle frames to incorporate other crankshaft designs. Multiple riders can be connected in series as usually seen in tandem bicycles. Of course, this invention can be used in a variety of human powered machines other than bicycles, such as aircraft, watercraft, and electrical generators. An electrical generator arrangement is shown in schematic exploded form in FIG. 9, where a rotary element 56 of an electrical generator may be fixed to the crankshaft 34, driven by crank arms 20R and 20L through one-way clutches 16R and 16L and crankshaft adaptors 10R and 10L, while the remainder 64 of the of the generator is attached to or incorporated into the frame of the machine.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. A power transfer mechanism drivingly connected to a power output device, for use on a human powered machine having a frame defining a crankshaft bearing housing, the power transfer mechanism comprising:
    (a) a single crankshaft mounted for rotation about an axis;
    (b) at least one rotary drive element fixed to said crankshaft for rotation therewith, and for transfer of power from said crankshaft to said power output device;
    (c) a pair of crank arms, each independently rotatable through an unlimited angle of rotation with respect to said axis;
    (d) a pair of one-way clutches, a respective one of said one-way clutches being associated with each said crank arm and drivingly interconnecting each said crank arm independently with said crankshaft to move said crankshaft in a forward direction at a speed at least equal to a speed of rotation of each said crank arm in response to movement of either of said crank arms in said forward direction, said crankshaft -remaining free to rotate in said forward direction with respect to each of said crank arms at all times.

2. The power transfer mechanism of claim 1, said mechanism being free of any driving interconnection other than said one-way clutches between either of said crank arms and said crankshaft, and each of said crank arms thus being at all times free to move opposite said forward direction of rotation with respect to said crankshaft.

3. The power transfer mechanism of claim 1, said mechanism being free of elements other than said one-way clutches limiting rotation of said crank arms with respect to said crankshaft.

4. The power transfer mechanism of claim 1, wherein said power output device is an electrical generator, said rotary drive element being connected drivingly to a rotor of said electrical generator, and another part of the generator being configured to be fixedly attached to the frame of the machine.

5. A power transfer mechanism connected to a power output device, for use on a human powered machine having a frame defining a crankshaft bearing housing, the power transfer mechanism comprising:
    (a) a single crankshaft mounted for rotation about an axis;
    (b) at least one electrical generator element fixed to said crankshaft for rotation therewith for transfer of power from said crankshaft to said power output device;
    (c) a pair of pedal crank arms, each independently rotatable through an unlimited angle of rotation with respect to said axis;
    (d) a pair of one-way clutches, a respective one of said one-way clutches being associated with each said crank arm and drivingly interconnecting each said crank arm independently with said crankshaft to move said crankshaft in a forward direction at a speed at least equal to a speed of rotation of each said crank arm in response to movement of either of said crank arms in said forward direction, said crankshaft remaining free to rotate in said forward direction with respect to each of said crank arms at all times.

6. The power transfer mechanism of claim 5, said mechanism being free of any driving interconnection other than said one-way clutches between either of said crank arms and said crankshaft, and each of said crank arms thus being at all times free to move opposite said forward direction of rotation with respect to said crankshaft.

7. The power transfer mechanism of claim 5, said mechanism being free of elements other than said one-way clutches limiting rotation of said crank arms with respect to said crankshaft.

8. A replacement power transfer mechanism, for installation in a conventional bicycle having a crankshaft bearing housing and a crankshaft having a pair of ends and which is mounted for rotation with respect to said crankshaft bearing housing about a transverse axis defined by said crankshaft bearing housing, the replacement power transfer mechanism comprising:
    (a) at least one rotary drive element configured to be fixed to said crankshaft, for rotation therewith and to transfer power from said crankshaft to a driven rear wheel of said conventional bicycle;
    (b) a pair of pedal crank arms;
    (c) a pair of crankshaft adaptors, each configured to be attached separately to a respective end of said crankshaft; and
    (d) a pair of one-way clutches, a respective one of said one-way clutches being associated with each said crank arm and a respective one of said crankshaft adaptors so that each said crank arm is free to rotate through an unlimited angle of rotation about said crankshaft adaptor in a rearward direction and so that each said crank arm is adapted to be drivingly interconnected independently with said crankshaft through the respective crankshaft adaptor to move said crankshaft in a forward direction at a speed at least equal to a speed of rotation of each said crank arm, in response to movement of either of said crank arms in said forward direction, while said crankshaft remains free to rotate in said forward direction with respect to each of said crank arms at all times when said replacement power transfer mechanism is installed on said crankshaft.

9. The power transfer mechanism of claim 8, said mechanism being free of elements other than said one-way clutches configured to limit rotation of said crank arms with respect to said crankshaft.

10. The power transfer mechanism of claim 8, said mechanism being configured to be free of any driving interconnection other than said one-way clutches between either of said crank arms and said crankshaft, and each of said crank arms thus being configured to be at all times free to move opposite said forward direction of rotation with respect to said crankshaft.

11. The power transfer mechanism of claim 8, further including a flexible drive member engaged with said rotary drive element to be driven thereby.

12. The power transfer mechanism of claim 11, wherein said rotary drive element includes a chainring and said flexible drive member engaged therewith is an endless chain.

13. In combination with a bicycle having a crankshaft bearing housing and a crankshaft having a pair of ends and which is mounted for rotation with respect to said crankshaft bearing housing about a transverse axis defined by said crankshaft bearing housing, a power transfer mechanism comprising:

(a) at least one rotary drive element fixed to said crankshaft, for rotation therewith and for transferring power from said crankshaft to a driven rear wheel of said bicycle;

(b) a pair of pedal crank arms each connected with said crankshaft and independently rotatable through an unlimited angle of rotation with respect to said crankshaft bearing housing; and (c) a pair of one-way clutches each interposed between a respective end of said crankshaft and a respective one of said crank arms so that each said crank arm is free to rotate through an unlimited angle of rotation about said crankshaft in a rearward direction and so that each said crank arm is drivingly interconnected independently with said crankshaft to move said crankshaft in a forward direction at a speed at least equal to a speed of rotation of each said crank arm in response to movement of either of said crank arms in said forward direction, and said crankshaft being free to rotate in said forward direction with respect to each of said crank arms at all times.

\* \* \* \* \*